United States Patent [19]

Dhuyvetter et al.

[11] 4,125,017
[45] Nov. 14, 1978

[54] REDUNDANT INERTIAL MEASUREMENT SYSTEM

[75] Inventors: Henry J. Dhuyvetter, Westminster; Paul D. Engelder, Rancho Palos Verdes; Joseph C. Simmons, Manhattan Beach, all of Calif.

[73] Assignee: McDonnell Douglas Corporation, Long Beach, Calif.

[21] Appl. No.: 820,249

[22] Filed: Jul. 29, 1977

[51] Int. Cl.² ............... G01C 19/02; G01C 23/00
[52] U.S. Cl. ............................. 73/178 R; 74/5.34
[58] Field of Search ............ 73/178 R, 504; 364/434, 364/443, 453; 74/5.34

[56] References Cited

U.S. PATENT DOCUMENTS

| 3,391,568 | 7/1968 | Dozier | 73/178 R X |
| 3,463,909 | 8/1969 | Weiss | 73/178 R X |
| 3,489,004 | 1/1970 | Barnhill et al. | 73/178 |

Primary Examiner—James J. Gill
Attorney, Agent, or Firm—Henry M. Bissell

[57] ABSTRACT

A system providing economical redundant strap-down inertial measurement capability in a space navigation system. By appropriate orientation of two-degree-of-freedom dry tuned rotor gyros, the system is able to achieve complete redundancy utilizing only three gyro units. With this orientation, both orthogonal and skewed rate data are available. Not only are the necessary computations materially simplified, but this system also provides the necessary conditions for failure detection and isolation.

12 Claims, 3 Drawing Figures

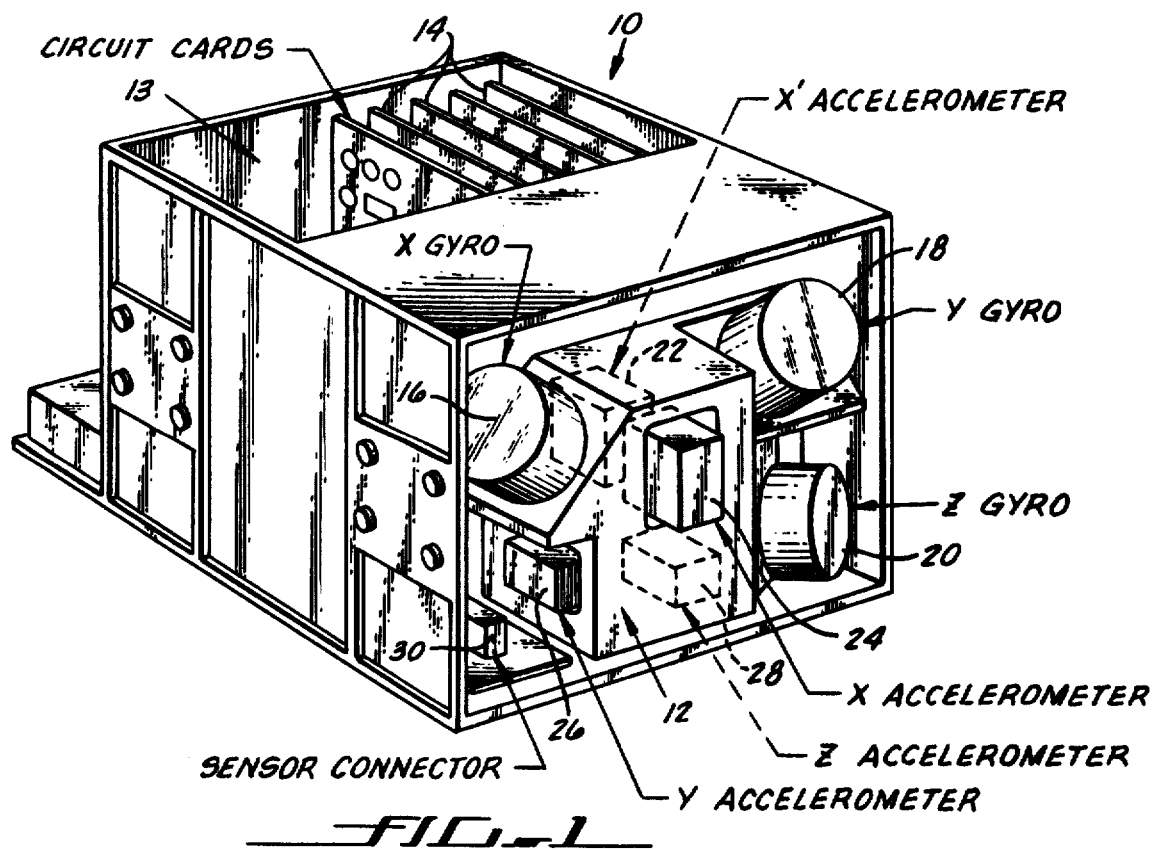
FIG_1
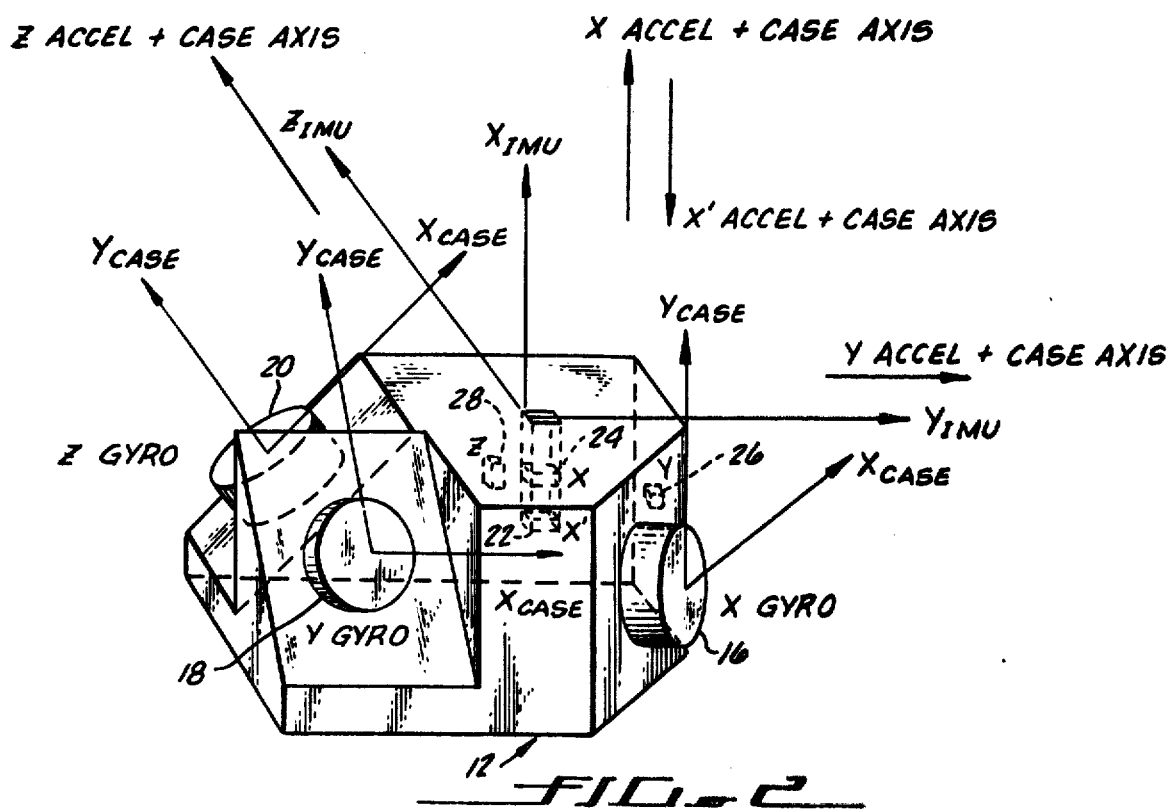
FIG_2

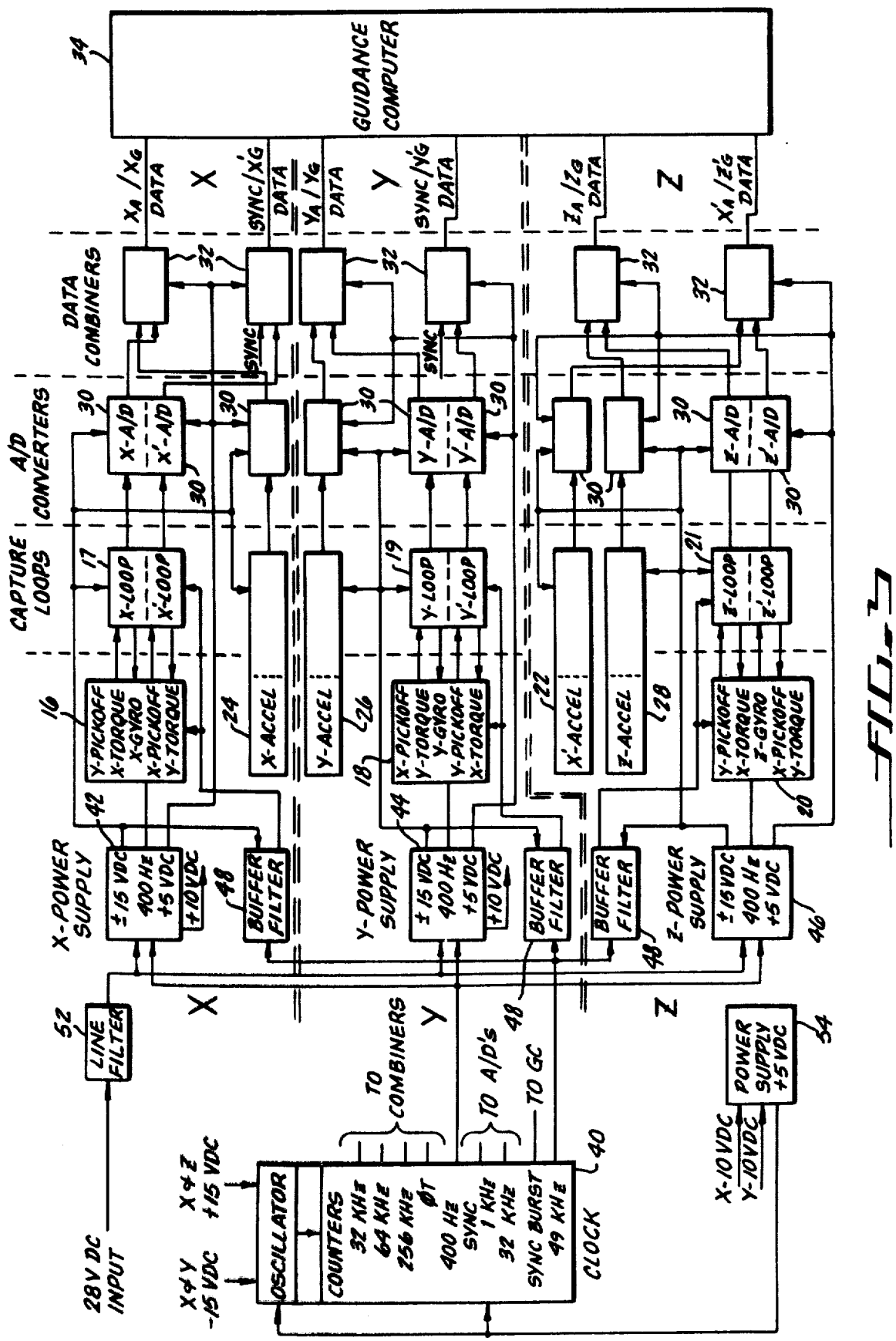

REDUNDANT INERTIAL MEASUREMENT SYSTEM

BACKGROUND OF THE INVENTION

1. Field of the Invention

This invention relates to inertial navigation systems and, more particularly, to such systems of the strap-down type.

2. Description of the Prior Art

All inertial navigation systems provide for the isolation of the accelerometers from rotations of the vehicle. Gyroscopes (gyros) are used for such isolation. In the inertial platform type of system, the gyros drive gimbals which physically isolate the platform-mounted accelerometers from vehicle rotations. In the strap-down type of system, the gyro outputs are coupled to a computer which computationally isolates the outputs of the vehicle-mounted accelerometers from the vehicle rotations to which the accelerometers are physically subjected. Strap-down systems place stringent requirements on the gyro dynamic range performance in maintaining a space fixed reference in a vehicle. A three-axis platform requires three single-degree-of-freedom gyros arranged orthogonally for proper operation. In the prior art, particularly as applied to space vehicles and others where extreme reliability over a considerable period of time is required, the need for redundancy for protection against component failure dictated using at least five gyros to achieve both failure detection and correction. This not only increases the number of gyros required to provide redundancy but it also increases the number of channels including the circuitry for processing the gyro signals.

Recently, a new type of gyro has been developed which provides two degrees of freedom, rather than one. This is a so-called dry tuned rotor gyro and it is possible, in embodiments of the invention shown and described herein, to arrange three two-degree-of-freedom dry tuned rotor gyros or their equivalent in a particular orientation so that both orthogonal and skewed rate data are available with complete redundancy, utilizing only the three units. This affords not only a saving in the number of gyros required, but also a corresponding reduction in the associated circuitry.

SUMMARY OF THE INVENTION

In brief, arrangements in accordance with the present invention comprise three two-degree-of-freedom dry tuned rotor gyros mounted on a specially shaped case on three differently-angled mounting surfaces which are so arranged that both an orthogonal and a 45° skewed set of axes can be achieved. If a cube having four vertical faces and two horizontal faces be considered, each of the three differently-angled mounting surfaces may be described as being at 45° with respect to a pair of faces of the cube. Two of the gyro mounting surfaces—those mounting the Z axis and the Y axis gyro—are respectively inclined at 45° from first and second adjacent vertical faces and from a horizontal face of the cube. The third mounting surface—that for the X-axis gyro—is at 45° to the second and third vertical faces of the cube and itself is in a vertical plane.

Considered more generally, and with reference to any type of gyro having a pair of orthogonal axes (primary and secondary), three such gyros are mounted so that their primary axes are directed mutually orthogonally, say along arbitrarily designated X, Y and Z axes. Each gyro is then further oriented so that its remaining, secondary, axis is at 45° to the primary axes of the other two gyros. Thus the gyro having its primary axis aligned with the X axis, here designated the X gyro, has its secondary axis aligned at 45° to the Y and Z axes in the Y-Z plane. Similarly the Y gyro has its secondary axis aligned at 45° to the X and Z axes in the X-Z plane, and the Z gyro secondary axis is at 45° to the X and Y axes in the X-Y plane.

By mounting gyros of this particular type on the three respective mounting surfaces as defined, the gyros each have a first axis which combines with the other two gyro first axes to form an orthogonal triad and a second axis which, combined with the other two gyro second axes, forms a second set skewed at 45° to the first triad. The associated electronics utilize a common power source and clock which furnish raw power and timing to three identical gyro driving and data conversion circuits. Any one of these circuits can be lost, due to a failure, and the unit continues to accomplish its function based on the data provided by the other two channels. The data from this inertial measurement unit (IMU) is provided over six lines to an associated computer for processing. Because of the skewed axis data, it is possible to form three independent measurements of vehicle rates along each of the orthogonal axes of the IMU. The failure detection and selection process is provided by software logic which compares relative performance on these equivalent measurements.

Although the particular unit described herein is designed for special application to space booster launch vehicles, suitable selection of the instruments used and scaling of the electronics make it possible to utilize the same design in most applications where three-axis inertial reference is required. Applications of particular interest may be in aircraft and cruise missile type vehicles.

BRIEF DESCRIPTION OF THE DRAWING

A better understanding of the present invention may be had from a consideration of the following detailed description, taken in conjunction with the accompanying drawing, in which:

FIG. 1 is a perspective view of a redundant inertial measurement system in accordance with the present invention;

FIG. 2 is a schematic view of the sensor block of the system of FIG. 1; and

FIG. 3 is a functional block diagram of the system of FIG. 1.

DESCRIPTION OF THE PREFERRED EMBODIMENT

As shown in FIG. 1, a redundant inertial measurement system 10 in accordance with the invention principally comprises a sensor block 12 in which all of the sensing elements are mounted and an electronics section 13 comprising a plurality of circuit cards 14 which provide the processing of the sensor data into a digital pulse representation. The sensor block 12 carries the X gyro 16, the Y gyro 18 and the Z gyro 20 mounted on three respective orthogonally oriented mounting surfaces. Also shown mounted to the sensor block 12 are the X' accelerometer 22, the X accelerometer 24, the Y accelerometer 26 and the Z accelerometer 28. The sensor block connector 30 is also shown as a part of the sensor block in FIG. 1.

The orientation of the respective gyros and accelerometers may be better seen in FIG. 2 which shows the sensor block 12 rotated 180° and turned over on its back from the orientation shown in FIG. 1. In FIG. 2, which shows the sensor block 12 in its true orientation in the space vehicle, the directions $X_{IMU}$, $Y_{IMU}$, $Z_{IMU}$ represent the coordinate axes of the inertial measure unit (IMU). The X, Y and Z gyros 16, 18, and 20 are two-axis dry tuned gyros, specifically Teledyne Model SDG-5 gyros, which permit the orientation of the three gyros in combination to develop two completely redundant sets or triads of three axes each. From FIG. 2, it may be seen that if the sensor block 12 is viewed as a cube, the Y and Z gyros 18, 20 are mounted on surfaces which are angled at 45° from respective first and second sides of the cube. The X gyro is mounted on a surface in a vertical plane which is at 45° with respect to the second and third sides of the cube. Each of the three gyros has two orthogonal axes, referred to in FIG. 2 as $X_{case}$ and $Y_{case}$. These respective axes directions are shown in FIG. 2 with the $X_{case}$ axes of the X and Y gyros and the $Y_{case}$ axis of the Z gyro parallel to the plane of the Y-Z axes of the IMU. In addition, the directions of the X, X', Y and Z accelerometers are also shown in FIG. 2. The X' accelerometer is oppositely directed from the X accelerometer and provides redundance for accelerometer measurements along the X (vertical) axis.

Other system components and their functional interrelationship are represented schematically in the block diagram of FIG. 3. Thus, the X gyro 16 is shown coupled to a capture loop stage 17, the combination of which provides a gyro caging loop system using cross feed shaping networks for gyro control. Similarly, the Y gyro 18 is shown coupled to a capture loop stage 19 and the Z gyro 20 is shown coupled to a capture loop stage 21. In each of these gyro caging loop systems, Y-pickoff signals are applied to a shaping network in the associated capture loop stage and shaped in a cross feed network for return to the X-torque element in the gyro. In similar fashion the X-pickoff signals are processed in a shaping network in the associated capture loop stage and returned in a cross feed network to the Y-torque element of the gyro.

IMU signals from each of the two axes of the three gyros and from the four accelerometers are applied to a set (10 in all) of analog-to-digital (A/D) converters 30. These A/D converters are of the integrating type, bipolar in operation, and act to process the analog voltages from the gyro capture loops and accelerometers and convert them to digital output signals having a duration corresponding to the amplitude of the analog signal with an indication of the polarity thereof.

Coupled to the output of the A/D converters 30 is a plurality (six in number) of data combiners 32 which provide digital signals corresponding to the output of the A/D converters 30 to an associated guidance computer 34. Each of the data combiners 32 has two distinct inputs and is capable of processing and combining the signals from two A/D converters 30 for transmission as a multiplexed signal over its single data line to the guidance computer 34. Since the six data combiners 32 together have the capability of processing signals on 12 inputs, and there are only 10 A/D converters 30, the two unused inputs are coupled to receive a sync word from the system clock 40. The data combiners 32 make use of this sync word in the multiplexing process and pass it along to the guidance computer 34 as information used in demultiplexing the data.

It will be noted in FIG. 3 that the various components are organized by channels—the X gyro 16 and its associated capture loop stage 17, the X accelerometer 24, the three A/D converters 30 and the two data combiners 32 associated with these elements are shown in an X channel along the top of the figure; the Y accelerometer 26, the Y gyro 18 and its associated capture loop stage 19, the three A/D converters 30 associated with these elements in the corresponding two data combiners 32 are shown in a Y channel extending along the middle of the figure; and the Z gyro 20 and the associated capture loop stage 21, the X' accelerometer 22 and the Z acceleormeter 28, the four A/D converters 30 associated with these elements and the corresponding two data combiners 32 are shown in a Z channel along the bottom of FIG. 3. Each separate channel has its own power supply; the X power supply 42 in the X channel, and Y power supply 44 in the Y channel and the Z power supply 46 in the Z channel. Also provided separately for each channel is a buffer/filter 48 which is part of the gyro caging loop system of the corresponding channel. The clock 40 provides appropriate timing signals to all of the channels. The basic clock frequency is 32 KHz. Timing signals at 32 KHz, 64 KHz, and 256 KHz as well as a transmit phase signal are applied from the clock to the data combiners 32. A 400 Hz synchronizing signal is applied to the three power supplies 42, 44 and 46 for ultimate application to the gyros. A sync burst signal is sent from the clock 40 to the guidance computer 34 and is also the source of the sync words applied to the two data combiners 32. 1 KHz and 32 KHz timing signals are also provided by the clock to the A/D converters 30. The clock 40 also provides a 49 KHz signal to the three buffer/filter stages 48.

Voltage for the respective power supplies 42, 44 and 46 is received from the vehicle 28 volt DC primary system via a line filter 52. The power supply 54 for the clock 40 develops the desired 5 volts DC by gating ten volt DC outputs from the X and Y power supplies 42, 44. Each of the X, Y and Z power supplies 42, 44 and 46 develops ± 15 volt DC for its associated capture loop stage, buffer/filter, accelerometer, and A/D converters. Each power supply 42, 44 and 46 also provides a 400 Hz signal to spin its associated gyro and 5 volts DC for the logic circuitry of the data combiners 32 in the same gyro channel.

The system of the present invention as shown in FIGS. 1-3 is designed with precision, effectiveness, and realiability as primary considerations. The reliability objective depends in part on a simplification of circuitry and system components, and the judicious use of such to provide built-in redundancy wherever practical. Thus, the mounting of the three gyros, which are of the two-axis type, is arranged to provide two distinct sets of rate data, thereby achieving gyro signal redundancy protection for the system. Since only three gyros are employed, an independent three-channel electronic system for processing the gyro signals is sufficient to achieve the desired redundancy. If there is a failure in one of the gyros or its associated electronics channel, the information normally processaed by that channel can be derived from the other two gyros which provide information with respect to the one axis because of the cross coupling between axes which is inherent in the gyro.

If the signal from either the X or X' accelerometer is lost, the signal from the other accelerometer of the pair still provides the needed information, there being redundancy with respect to the X and X' accelerometers.

Accelerometer information with respect to the X axis is the most important of the three axes. The accelerometers for the Y and Z (pitch and yaw) axes are not redundant, but this information is only weakly related to mission success. Generally, there is not very much acceleration with respect to those two axes. The only time this information is really critical is in approximately the first minute of launch. After that, with the vehicle out of the atmosphere, there is little data provided by these acceleration components. Redundancy is provided with respect to the power supplies for the three separate channels, there being a separate power supply for each channel. The clock timer for the system is common to all channels. However, the clock power supply is developed to provide redundancy for the clock. The X and Y and X and Z power supplies are gated together to provide the positive and negative 15 volts DC for the clock oscillator. (See the top of the block 40 in FIG. 3). Also, at the lower end of the block representing the X and Y power supplies in FIG. 3, 10 volts DC is picked off and gated together in the power supply 54 which provides five volts DC to the clock 40.

Since the 45° skewed set of gyro axes provides data which is independent of the orthogonal set of gyro axes, it is possible to form three independent measurements of vehicle rates along each of the orthogonal axes of the inertial measurement unit. Software logic in the guidance computer 34 compares relative performance with respect to these measurements and makes the decision as to which is to be selected when there is a discrepancy. This also involves the detection of failure in the system. For example, if there were a discrepancy between data provided by the X channel as contrasted with corresponding information received by the guidance computer over the Y and Z channels, this would be interpreted as a failure somewhere in the X channel and thereafter the data from that channel could be ignored, relative to data from the Y and Z channels.

Although there has been described above a particular arrangement of a redundant inertial measurement system in accordance with the invention for the purpose of illustrating the matter in which the invention may be used to advantage, it will be appreciated that the invention is not limited thereto. Accordingly, any and all modification, variations or equivalent arrangements which may occur to those skilled in the art should be considered to be within the scope of the invention as defined in the appended claims.

What is claimed is:

1. A redundant inertial measurement system for use in space navigation comprising:
   three gyros, each having at least two degrees of freedom and including first and second mutually orthogonal axes;
   means for mounting said gyros in three distinct attitudes with the respective first axes orthogonally directed with respect to each other so as to develop a first orthogonal triad including the first axis of each gyro and the respective second axes directed at 45° with respect to corresponding pairs of said first axes so as to develop a second triad skewed at 45° to the first triad, the second triad including the second axis of each gyro;
   means for deriving rate information relative to the first and second triads; and
   means for processing said information.

2. The system of claim 1 wherein the gyros are respectively X, Y and Z gyros and wherein the gyros are mounted with the first axes aligned respectively with different ones of three orthogonal, arbitrarily designated X, Y and Z axes, the X gyro having its second axis at 45° to the Y and z axes in the Y–Z plane, the Y gyro having its second axis at 45° to the X and Z axes in the X–Z plane, and the Z gyro having its second axis at 45° to the X and Y axes in the X–Y plane.

3. The system of claim 2 wherein the mounting means comprises a sensor block having X, Y and Z orthogonal axes and an upper face parallel to a Y–Z plane defined by the Y and Z axes; three 45°-angled mounting surfaces, one for each of the X, Y and Z gyros, the orientation of the mounting surfaces being defined by reference to first, second and third planes at right angles to said Y–Z plane, the first and second planes being at right angles to each other and the second and third planes being at right angles to each other, the mounting surface for the Z gyro being angled at 45° with respect to the first plane and the Y–Z plane, the mounting surface for the Y gyro being angled at 45° with respect to the second plane and the Y–Z plane, and the mounting surface for the X gyro being angled at 45° with respect to the second and third planes and at 90° to the Y–Z plane.

4. THe system of claim 3 wherein said gyros are mounted on the mounting surfaces with orientation such that the first axes of the X and Y gyros are directed parallel to the Y–Z plane of the sensor block and the second axis of the Z gyro is directed parallel to said Y–Z plane.

5. The system of claim 1 wherein the three gyros are connected respectively in three distinct gyro channels with associated driving and signal processing means for providing gyro channel redundancy in said system.

6. The system of claim 5 wherein the signal processing means includes separate means in each gyro channel for separately processing signal from the first and second axes of the gyro in that channel.

7. The system of claim 5 wherein each distinct gyro channel includes a capture loop coupled to the gyro of that channel for caging the gyro, a pair of analog-to-digital converters for converting analog signal information from the two axes of the gyro to digital signals corresponding thereto, and means for combining the digital signals with other digital signals in multiplexed form for transmission on a single output data line.

8. The system of claim 7 wherein each channel further includes an individual power supply for powering the gyro and other components of that channel.

9. The system of claim 8 wherein each channel further includes at least one accelerometer for providing acceleration information relative to an axis corresponding to the gyro of that channel and an analog-to-digital converter coupled to the accelerometer for converting analog signals to digital signals for application to the signal combining means.

10. The system of claim 9 wherein one of said gyro channels further includes a second accelerometer in addition to a first accelerometer along the same axis thereof for providing redundant acceleration information relative to that axis, and an additional analog-to-digital converter coupled to the second accelerometer for converting analog signals therefrom to digital signals for application to the signalcombining means.

11. The system of claim 10 further including timing means for generating timing control signals to each of the three gyro channels respectively, and means for providing power to the timing means, said last-mentioned means comprising means for combining outputs from the respective power supplies of the three channels by pairs to develop redundant power supplies coupled to the timing means.

12. The system of claim 1 wherein each of said gyros is a two-degree-of-freedom dry tuned rotor gyro.

* * * * *